United States Patent [19]
Fuisz et al.

[11] Patent Number: 5,348,758
[45] Date of Patent: Sep. 20, 1994

[54] CONTROLLED MELTING POINT MATRIX FORMED WITH ADMIXTURES OF A SHEARFORM MATRIX MATERIAL AND AN OLEAGINOUS MATERIAL

[75] Inventors: Richard C. Fuisz, Great Falls; Gerald E. Battist, Reston, both of Va.; Richard C. Appl, Downers Grove; Anthony P. Richards, Chicago, both of Ill.

[73] Assignee: Fuisz Technologies Ltd., Chantilly, Va.

[21] Appl. No.: 964,022

[22] Filed: Oct. 20, 1992

[51] Int. Cl.⁵ .............................................. A23G 3/00
[52] U.S. Cl. .................................. 426/660; 426/517; 426/601; 426/633; 426/658
[58] Field of Search ............... 426/658, 660, 517, 601, 426/633

[56] References Cited

U.S. PATENT DOCUMENTS

| | | |
|---|---|---|
| 2,826,169 | 3/1958 | Le Veen . |
| 2,918,404 | 12/1959 | Mende et al. . |
| 3,019,745 | 2/1962 | Du Bois et al. . |
| 3,036,532 | 5/1962 | Bowe . |
| 3,067,743 | 12/1962 | Merton et al. . |
| 3,070,045 | 12/1962 | Bowe . |
| 3,073,262 | 1/1963 | Bowe . |
| 3,095,258 | 6/1963 | Scott . |
| 3,131,428 | 5/1964 | Mika . |
| 3,308,221 | 3/1967 | Opfell . |
| 3,324,061 | 6/1967 | Tanquary et al. . |
| 3,557,717 | 1/1971 | Chivers . |
| 3,595,675 | 7/1971 | Ash et al. . |
| 3,615,671 | 10/1971 | Schoaf . |
| 3,625,214 | 12/1971 | Higuchi . |
| 3,723,134 | 3/1973 | Chivers . |
| 3,762,846 | 10/1973 | Chivers . |
| 3,856,443 | 12/1974 | Salvi . |
| 3,875,300 | 4/1975 | Homm et al. . |
| 3,925,525 | 12/1975 | LaNieve . |
| 3,930,043 | 12/1975 | Warning et al. . |
| 3,951,821 | 4/1976 | Davidson . |
| 3,967,623 | 7/1976 | Butterworth et al. . |
| 3,972,725 | 8/1976 | Nicol . |
| 3,992,265 | 11/1976 | Hansen . |
| 4,081,559 | 3/1978 | Jeffery et al. ................. 426/660 |
| 4,090,920 | 5/1978 | Studer, Jr. . |
| 4,136,145 | 1/1979 | Fuchs et al. . |
| 4,153,512 | 5/1979 | Messner et al. . |
| 4,293,570 | 10/1981 | Vadasz . |
| 4,303,684 | 12/1981 | Pitchon et al. . |
| 4,371,516 | 2/1983 | Gregory et al. . |
| 4,376,743 | 3/1983 | Dees . |

(List continued on next page.)

FOREIGN PATENT DOCUMENTS

| | | |
|---|---|---|
| 91/18613 | 12/1991 | PCT Int'l Appl. . |
| 88/2770 | 4/1988 | South Africa . |
| 88/2771 | 4/1988 | South Africa . |
| 88/9318 | 12/1989 | South Africa . |
| 90/2139 | 3/1990 | South Africa . |
| 90/8406 | 8/1991 | South Africa . |

OTHER PUBLICATIONS

Massoud Kazemzadeh, Ph.D., *Food Process Design Developing Product Through Extrusion* (Jul. 1992).

*Primary Examiner*—Helen Pratt
*Attorney, Agent, or Firm*—Hoffmann & Baron

[57] ABSTRACT

A controlled melting point matrix is disclosed. The matrix is formed by admixing low melting point hydrophobic materials with a substantially amorphous material obtained from subjecting a feedstock to conditions of temperature and pressure which induce flash flow of the feedstock. The admixture is then subjected to conditions which induce at least partial crystallization of the substantially amorphous material thereby capturing the hydrophobic material and providing the controlled melting point matrix of the invention. Methods of producing a controlled melting point matrix are disclosed. Methods of using controlled melting point matrices to form improved comestibles are also disclosed.

41 Claims, No Drawings

U.S. PATENT DOCUMENTS

| | | |
|---|---|---|
| 4,492,685 | 1/1985 | Keith et al. . |
| 4,496,592 | 1/1985 | Kuwahara et al. . |
| 4,500,546 | 2/1985 | |
| 4,526,525 | 7/1985 | Oiso et al. . |
| 4,585,797 | 4/1986 | Cioca . |
| 4,619,833 | 10/1986 | Anderson . |
| 4,793,782 | 12/1988 | Sullivan . |
| 4,855,326 | 8/1989 | Fuisz . |
| 4,873,085 | 10/1989 | Fuisz . |
| 4,885,281 | 12/1989 | Handstein et al. . |
| 4,978,537 | 12/1990 | Song . |
| 4,997,856 | 3/1991 | Fuisz . |
| 5,011,532 | 4/1991 | Fuisz . |
| 5,028,632 | 7/1991 | Fuisz . |
| 5,034,421 | 7/1991 | Fuisz . |
| 5,073,387 | 12/1991 | Whistler . |
| 5,082,682 | 1/1992 | Peterson . |
| 5,082,684 | 1/1992 | Fung . |
| 5,084,295 | 1/1992 | Whelan et al. . |
| 5,094,872 | 3/1992 | Furcsik et al. . |
| 5,096,492 | 3/1992 | Fuisz . |

CONTROLLED MELTING POINT MATRIX FORMED WITH ADMIXTURES OF A SHEARFORM MATRIX MATERIAL AND AN OLEAGINOUS MATERIAL

BACKGROUND OF THE INVENTION

The present invention relates to a novel controlled melting point matrix which can be used to obtain improved comestible products, and a method of making the same. In particular, the present invention alters the melting point of a fat containing matrix by providing a controlled ratio of a shearform saccharide and a fat in the matrix.

Fats and oils are widely used in food, cosmetic and pharmaceutical products. Many naturally occurring edible fats and oils have low melting points. As a result, when incorporated in another food product, the oils or fats tend to migrate out of the mixture imparting an undesirable look and feel to the final product.

A typical example is the separation of peanut oil from peanut butter and its migration into the chocolate layer of a peanut butter candy bar. The resulting bar is no longer covered by a glossy looking chocolate layer, instead it is greasy, sticky and unpleasant to handle.

Another typical example is the tendency of cocoa butter to separate from other chocolate ingredients in conventional chocolate products. As a result, chocolate made with cocoa butter by conventional methods softens easily particularly in summertime and tends to flow or stick to its wrapper. Furthermore, cool weather can engender growths of crystallized cocoa butter on the surface of the chocolate resulting in a discoloration which appears as a white discoloration. This is commonly referred to as blooming.

Several attempts have been devised to remedy the problems caused by the use of low melting fats and oils in fat based culinary products. For instance, chocolates have been made by replacing low melting point fats or oils with fats having higher melting points.

One way to alter fat to increase its melting point is by immobilizing the fat by hydrogenation. Hydrogenation, however, is expensive and leads to undesirable physiological properties in food products.

Immobilization of fats can also be achieved by the use of stabilizers. For example, Canadian Patent No. 979,730 discloses a fat or oil-containing system in which colloidal silicone dioxide is incorporated with the fat. A polyol bridging compound is then added in order to bind the low melting point oil in a stable matrix formed by silicon dioxide particles and the polyol. Although the resulting product shows little change in viscosity at elevated temperatures, it is undesirable because consumers view silicon dioxide as an undesirable synthetic additive.

According to another process described in Swiss Patent No. 519,858, fats have been immobilized by first encapsulating the fat within vesicles or microbeads made of a non-liposoluble envelope which is then incorporated into a chocolate composition.

Swiss Patent Nos. 399,891 and 489,211 disclose the use of a finely ground amorphous sugar mixed with a conched chocolate mass containing sugar in crystallized form to produce a heat-resistant chocolate product. The finely ground amorphous sugar used in these patents is made by a complex process. A concentrated syrup of sugar is cooked under vacuum up to approximately 1–2% moisture and then distributed on plates cooled by water in order to bring the temperature to 80° C. The sugar is then spread in the form of a layer not over 5 millimeters thick, using a mechanical installation. The sugar is then either immediately used or kept in moisture tight containers. Prior to mixing with the other chocolate ingredients, the amorphous sugar must be ground in an apparatus known as a "micronizer", manufactured by Pennsalt Ltd. The grinding operations are executed in a room where a constant relative humidity and temperature must be carefully maintained.

After molding and hermetically packing the product, the chocolate is subjected to a heat treatment which consists of keeping the product at a constant temperature between 20°–35° C. for a period of time from 10–60 days. While this method purportedly produces a heat resistant chocolate, it is costly and time consuming both in the preparation of the amorphous sugar and the storage requirements necessary for the chocolate product of this method.

U.S. Pat. No. 4,084,011 discloses yet another approach for the use of amorphous sugar in the preparation of milk crumb for use in the manufacture of milk chocolate. The crumb is prepared by mixing milk powder with sugar and cocoa liquor. When submitted to low pressures, the mixture forms a "fresh crumb" where the sugar is amorphous. Compressing the fresh crumb product under a pressure of at least 100 kilograms/cm$^2$ causes the amorphous sugar to crystallize forming the final milk crumbs. While this method allegedly produces a heat resistant milk chocolate, it has many steps, it requires expensive equipment and is time consuming.

Another approach is disclosed in U.S. Pat. Nos. 4,980,192 and 4,664,927. These patents describe the use of polyols which must either be a liquid or in a solution when mixed with the fat or oil. The fat-containing system must be in a somewhat flowable form when the polyol is added. This may be achieved by mixing the fat-containing material with the polyol at a slightly elevated temperature. In addition, it is necessary to hold the mixture of the polyol and fat-containing material in storage for periods of time ranging up to an hour or more in order to reach a desired viscosity level before further processing the material. Obviously, this process causes problems if the mixture of polyol and fat-containing material is stored too long. Lengthy storage causes the polyol mixture to become solidified.

Other approaches are disclosed in U.S. Pat. No. 4,446,166. This patent describes attempts that have been made to produce a heat resistant chocolate by incorporated crystalline hydrophilic substances such as dextrose, maltose, inverted sugar, fructose, xylose, mannitol or sorbitol as humectants and exposing the chocolate, after casting to a moist atmosphere for extended periods of time. The products prepared by this process have many problems. They have an undesirable surface appearance as the result of sugar bloom; they retain ready flowability of fat immediately below the surface of the chocolate; and they require costly and time consuming storage requirements.

While each of the above approaches have resulted in chocolate compositions resistant to elevated temperatures, the techniques and additives are expensive. Moreover, some of the procedures require synthetic materials, which are generally perceived as undesirable by the consumer. In addition, the incorporation of a stabilizer in chocolate may constitute a sufficient departure from the standard identity for "chocolate". Such perception could deprive the manufacturer of the ability to call a particular product a "chocolate" product.

It would, therefore, be extremely desirable to be able to provide natural low melting oils and fats in a matrix which can have a carefully engineered melting or flow point higher than the normal melting or flow point of that fat or oil. For example, by increasing the melting point of a conventional peanut butter spread, an improved, heat resistant peanut butter solid can be obtained which is resistant to peanut oil migration and is an excellent component in peanut butter candy bars. Similarly, it would be highly advantageous to produce a heat resistant chocolate product in which the preparation of the amorphous sugar used in the chocolate and the storage requirements of the product are not time consuming and costly.

It is, therefore, an object of the present invention to provide a matrix whose melting point can be carefully controlled. Another object of the present invention is to provide improved comestibles having a flow point temperature higher than that of a mixture of the nonprocessed ingredients. A further object of the invention is to provide improved chocolate and peanut butter containing products which have improved resistance to flow or melting under summertime conditions. Yet another object of the present invention is to provide a new method for producing improved products having controlled melting point in which the shortcomings of the prior art are overcome.

Other and further objects of the present invention will become apparent in the following description and its scope will be pointed out with the appended claims.

SUMMARY OF THE INVENTION

The present invention provides a controlled melting point matrix formed by admixing a low melting point hydrophobic material with a substantially amorphous material obtained from subjecting a feedstock to conditions of temperature and pressure which induce flash flow of the feedstock. The admixture is then subjected to conditions which induce at least partial crystallization of the substantially amorphous material thereby capturing the hydrophobic material and providing the controlled melting point matrix of the invention. The new melting point is different from the melting point of a mere mixture of the hydrophobic and nonprocessed feedstock. The present invention also includes a method of making the controlled melting point matrix. Methods of using the controlled melting point matrix to form improved comestibles are also included.

A substantially amorphous material is primarily a saccharide-based material formed either by a melt-spinning or a flash-shear process. Synthetic materials which can be spun into a useful substantially amorphous material are also encompassed by this invention. The feedstock used to form the substantially amorphous material may include a crystallization-control agent such as an antihumectant. The crystallization-control agent can be an oleaginous material selected from a non-limiting list including vegetable oil, cocoa butter, butter oil, cannola oil, corn oil, and mixtures thereof. Thus, the crystallization control agent can be the same ingredient which is used as a hydrophobic material.

Hydrophobic materials useful in forming the matrix of the invention include edible fats and oils and, especially, low melting oils and fats. A non-limiting list includes hydrogenated vegetable oil, cocoa butter, corn oil, cannola oil, peanut oil, soybean oil, and mixtures thereof.

Conditions inducing the formation of the controlled melting point matrix from the admixture of the substantially amorphous material and the hydrophobic material include ambient temperature, pressure and relative humidity. It is also important to maintain a ratio of the substantially amorphous material to the hydrophobic material from at least about 0.33 to about 2.33.

A method of making the control melting point matrix is also provided. The method of making of the present invention finds particularly preferred applications in forming improved comestibles such as an improved chocolate and/or peanut butter comestible.

As a result of the present invention, a method is provided for precisely engineering the melting point of a comestible. The controlled melting point has improved temperature stability and shows high resistance to the migration of oil out of the matrix.

The controlled melting point matrix of the invention is formed by a relatively inexpensive method. The substantially amorphous material can be inexpensively and contemporaneously made with the manufacture of the improved comestibles. The resulting improved comestibles show improved temperature stability while remaining very chewable.

For a better understanding of the present invention reference is made to the following description, the scope of which will be pointed in the appended claims.

DETAILED DESCRIPTION OF THE INVENTION

In the present invention a substantially amorphous shearform material is mechanically admixed with a hydrophobic material under conditions which cause the formation of a controlled melting point matrix. It has been surprisingly found that when the substantially amorphous shearform material and the hydrophobic material are in a ratio by weight such as 0.33 and above a solid matrix is formed which captures the hydrophobic material to provide a new melting point substance. The matrix is stable at high temperatures. Its melting point is significantly higher than that of the hydrophobic material, and higher than a mixture of non shearform processed feedstock and the same hydrophobic material.

The exact mechanism by which the controlled melting point matrix is formed is not known. It is, however, believed that when a substantially amorphous shearform material is mechanically mixed with a hydrophobic material and at least partially crystallized, the hydrophobic material is captured in a lattice structure, and the controlled melting point matrix of the invention is formed. Preferably, the ratio by weight of the converted amorphous feedstock to fat is at least about 0.33. The admixture becomes a uniform solid matrix which has a flow point higher than that of a mixture of the non-processed materials.

Moreover, it has been found that processing of the resulting admixture is significantly enhanced when the moisture content is kept at not more than about 2.5%, and preferably not more than about 1.5% by weight.

The substantially amorphous shearform material is processed by subjecting a feedstock to conditions of temperature and pressure which induce flash flow of the feedstock. Although the examples in this specification use a saccharide-based feedstock, any material which has a crystalline state and which can be subjected to conditions of temperature and pressure which induce flash flow to produce a substantially amorphous material can be used as the feedstock.

In a preferred embodiment, the saccharide feedstocks also include a crystallization control agent such as an antihumectant. The antihumectant is selected from a non-limiting list including such oleaginous materials as cocoa butter, peanut butter, milk fat, canola oil, corn oil, peanut oil, soybean oil, hydrogenated vegetable oil and mixtures thereof.

Commonly-assigned U.S. Pat. No. 5,034,421, the disclosure of which is incorporated herein by reference, discloses that the hydrophobicity of saccharide-based products can be increased by melt spinning with oleaginous materials. When the feedstock used to form the substantially amorphous material is a mixture of a saccharide-based material and an oleaginous material, the oleaginous material retards the effect of humidity on amorphous sugar.

Amorphous sugar or an oleaginous-bearing amorphous sugar can be produced by subjecting an appropriate feedstock to conditions of temperature and pressure which induce flash flow of the feedstock. The flash flow of the feedstock may be accomplished either by a flash heat process or by a flash shear process.

In the flash heat process a shearform matrix can be formed by spinning a feedstock in a "cotton candy" fabricating type machine. The spinning machine used to achieve a flash heat process can be a cotton candy type machine, such as the Econo Floss Model 3017 manufactured by Gold Metal Products Company of Cincinnati, Ohio. It will be appreciated by those skilled in the art that any apparatus or physical process which provides similar forces and temperature gradient conditions can also be used. For simplicity in disclosing and describing this invention, the terms "flash heat" will be understood to mean a process which includes subjecting a feedstock to the combination of temperature, thermal gradients, flow, flow rates, and mechanical forces of the type produced in a cotton candy machine. The apparatus is operated at the temperature and speed which permit flash flow of the feedstock without deterioration of any of its ingredients including, for example, a crystallization control agent.

The matrix obtained in a melt spinning process is in the form of a floss, fiber, particle, flake, spicule or any other generally non-descript amorphous aggregate. Disclosures which relate to spinning substances with one or more sugars are found in commonly-assigned U.S. Pat. Nos. 4,855,326, 4,873,085, 5,034,421, 4,997,856, 5,028,632 and 5,034,421. These disclosures describe processing feedstock material by subjecting it to high speed spinning on a spinning head in which the substance is also subjected to heating against a heating element.

In the flash heat process, the feed stock material is heated sufficiently to create an internal flow condition which permits part of the feedstock to move at a subparticle level with respect to the rest of the mass and exit openings provided in the perimeter of the spinning head. The centrifugal force created in the spinning head flings the flowing feedstock material outwardly from the head so that it reforms with a changed structure. The force required to separate and discharge flowable feedstock is only centrifugal force which results from the spinning head. The flash heat process is one process for producing an amorphous matrix such as the sugar floss used in this invention.

In the flash shear process, a shearform matrix is formed by raising the temperature of the feedstock material which includes a non-solubilized carrier to a point where the carrier such as a saccharide-based material undergoes internal flow upon application of a fluid shear force. The feedstock is advanced and ejected while in internal flow condition, and subjected to disruptive fluid shear forces to form multiple parts or masses which have a morphology different from that of the original feedstock.

The multiple masses are cooled substantially immediately after contact with the fluid shear force and are permitted to continue in a free-flow condition until solidified.

The feedstock material which can be used in a flash shear process includes but is not limited to a carrier such as a saccharide-based materials. Other materials such as oleaginous materials can also be included in the feedstock.

It is important that the feedstock selected for a flash shear process have the ability to be processed without reliance upon dissolution. In the case of a saccharide based materials, the feedstock is primarily a solid material which is subjected to the flash shear process.

The flash shear process can be carried out in an apparatus which has means for increasing the temperature of a non-solubilized feedstock and means for simultaneously advancing it for ejection. A multiple heating zone twin extruder can be used for increasing the temperature and advancing feedstock. The second element of the apparatus is a means for ejecting the feedstock in a condition for shearing it to provide the shearform matrix. The means for ejecting is in fluid communication with the means for increasing the temperature and is arranged at the point to receive the feedstock while it is in the internal flow condition. The means for ejecting the feedstock is preferably a nozzle which provides high pressure ejection of the feedstock material.

Finally, the apparatus also includes means for shearing the feedstock. The means for shearing is arranged proximally to the ejector and is disposed to effect the shear of the feedstock while it is in the internal flow condition. Preferably, the means for shearing is the means for delivering fluid such as air at high velocity and at elevated temperature against the feedstock stream as it exits a nozzle. Such a device can be an external atomizing nozzle. The means for shearing can also be a chamber in which the environment can be maintained to induce shear upon the collision of a high velocity of a stream of feedstock directed against a preselected and maintained environment.

In one embodiment of this invention the substantially amorphous shearform material is obtained by melt spinning saccharide-based feedstock, most preferably 6X granular sucrose. A non-limiting list of suitable saccharides includes sucrose, lactose, fructose, dextrose, sorbitol, mannitol, maltose and synthetically derived saccharide materials such as polydextrose, and the like, and mixtures thereof.

Alternative saccharide materials such as maltodextrins are also useful. Maltodextrins are composed of water-soluble glucose-based polymers obtained from the reaction of starch with enzymes or acid in the presence of water. The hydrolysis reaction produces a carbohydrate mixture of saccharides having a dextrose equivalence (D.E.) of less than 40. In one embodiment of the invention, the D.E. is between 20 and 40. These maltodextrin products have been classified by the FDA as corn syrup solids. In another embodiment the D.E. is between 10 and 20.

The maltodextrins useful in the present invention includes some products sold under the trademark MALTRIN by the Grain Processing Corporation of Muscatine, Iowa or "DRY-SWEET" variety of maltodextrins sold by the Hubinger Company of Keokuk, Iowa. Such products are available as powders, granules or the like.

Any hydrophobic material may be used in the admixture of the invention. Ordinarily, for comestible products, useful oleaginous materials are of animal and/or vegetable origin. Synthetic materials having substantially similar chemical compositions to fats and oils may also be used.

In one aspect of the present invention, the oleaginous material is a food-acceptable edible oil. Such materials are selected from hydrogenated vegetable oil, vegetable fat, soybean oil, safflower oil, olive oil, partially hydrogenated palm kernel oil, butter oil, corn oil, cannola oil, peanut oil, cocoa butter, mixtures thereof and the like. In this regard, the oleaginous materials preferably contain less than 30% saturated fats, with amounts of less than 20% being preferred and amounts of less than 15% being most preferred. The matrix of the invention, thus, advantageously allows the artisan to substitute or exchange "healthy" oils for a portion of the unhealthy saturated fats typically used in fat-based confectioneries.

In a further aspect of this invention, the oleaginous material can be a fat such as an edible animal fat, anhydrous milk fat, butter fat, lards, hydrogenated animal and/or vegetable oils, mixtures thereof and the like. A reduced calorie fat can also be used. CAPRENIN low calorie fat, a product of the Proctor & Gamble Company, is such a fat which can be used in the present invention.

In accordance with the present invention, the controlled melting point matrix is formed by admixing the substantially amorphous material with a hydrophobic material. In the context of the present invention "admixing" means combining at least two separate ingredients in the substantial absence of a medium, e.g., an aqueous medium, in which the dissolution of the ingredients occurs.

The conditions under which the substantially amorphous material changes to a crystalline phase include a combination of changes in the moisture, heat or ambient pressure. In the process of the invention moisture is preferably controlled to not exceed 30% relative humidity. More or less moisture can be used as needed for the different matrices. Increasing the pressure beyond atmospheric pressure will increase the rate at which a higher melting point is formed. The temperature of the admixture can be raised during and after admixing to exceed the melting point of the hydrophobic material but kept in a temperature range which is below the melting point of the crystalline form of the substantially amorphous material. A preferred temperature range for admixing is from about at least 100° F. to about 150° F.

It has been found that the weight ratio of the substantially amorphous material to the hydrophobic material is an important factor in the present invention. The ratio of amorphous sugar to oleaginous in the admixture can be further dependent on the presence of oil present as free oil, i.e., not intimately part of the admixture. If a material such as granular sugar is present, the free oil will be absorbed. As a result, lower ratios of amorphous sugars to oil can be used to provide a firm matrix. The ratio of amorphous sugar to free oil is preferably at least greater than 0.33. It has been found that admixing oleaginous material with even small amounts of amorphous sugar can provide a matrix which has improved temperature properties. A ratio of amorphous shearform matrix sugar to an edible oil of above 0.4 has provided a firm matrix which has shown excellent resistance to oil migration together with a dramatic improvement in temperature stability.

In a preferred embodiment the ratio by weight of the amorphous shearform matrix sugar to the low melting edible oil or cocoa butter present in the admixture is about 1 or greater than 1. A controlled melting point matrix having a shearform matrix sugar/fat ratio of above 1 shows a dramatic improvement in temperature stability and maintains a hard consistency at high temperatures. Interestingly, the flow point of the resulting matrix is much higher than the flow point of a mixture obtained by mixing the untreated materials.

In connection with melting and related phenomenon, the slip points of the controlled melting point matrix have been studied. In the context of the present invention, the "slip point" of a composition is the temperature at which an agent demonstrates internal breakdown of infrastructure. The test is conducted with capillary tubes having an internal diameter of 1.1 to 1.3 mm. The tubes are prepared by cleaning. They are then loaded by pressing each capillary into the agent to obtain a "plug" which is 1 cm long. A thermometer is attached to each capillary so that the heat-sensing reservoir (i.e., bulb of the thermometer) is adjacent the "plug" in the capillary. Each capillary with attached thermometer is immersed into water to a depth of not less than 4 cm below the surface of the water. The water is heated gradually with stirring so as to obtain a heating rate of 0.5° C. per minute. The point at which the agent starts to rise in the tube is the "slip point."

In some cases "flow points" were also determined using melt flow testing- Melt flow testing was conducted using a Kayeness model 7053 melt flow index tester, which is a microprocessor controlled instrument. The instrument provides heat to a test sample chamber and displays chamber temperature. A piston is placed on the sample to provide an extrusion force on the sample. In order to conduct a test, marble sized pieces of agent are placed in the sample chamber until the chamber is filled. The agent or sample is compressed using a Kayeness tamping tool. The piston is placed into the chamber and pressure applied until sample emerges out of the exit opening. A calibrated weight is placed on the piston. For chocolate and floss/fat samples 325 grams was used. The sample is heated in five or ten degree increments until a temperature proximal the expected flow point is reached. The temperature was equilibrated, and then increased until flow begins. The "flow point" is the temperature at which flow begins.

An increase in either the "slip point" or "flow point" of any controlled melting point composition over a non processed composition indicates beneficial results in terms of the present invention.

The present invention also provides a method of preparing a controlled melting point matrix. This is accomplished by admixing a substantially amorphous shearform material with a hydrophobic material and subjecting the resulting admixture to conditions which induce at least partial crystallization of the substantially amorphous shearform material, such that the hydrophobic material becomes captured during the partial crystallization process to provide the controlled melting point matrix. The substantially amorphous shearform material may be obtained from subjecting a sucrose feedstock to either a flash heat or a flash shear process. In one embodiment of the invention which is used for a chocolate comestible, the amorphous material is processed with an amount of cocoa butter or and/or lecithin or any other crystallization-controlling agent.

An important aspect of this invention is the ability to apply the process of the invention to form an improved comestible by incorporating into the comestible the controlled melting point matrix of the invention.

For example, improved cocoa butter compositions have been made by admixing cocoa butter, an amorphous shearform sugar and 6X granular sucrose at 130° F. and holding these compositions for a period of time at an elevated temperature. It has been found that when the ratio of amorphous shearform sugar to cocoa butter is at least about 0.33 an improved cocoa butter matrix is formed which is firm at elevated temperatures. A ratio of shearform sugar to cocoa butter of above 0.4 is preferred, with a value of about 1.0 being most preferred. Depending on the amount of 6X granular sucrose present in the admixture, an amorphous shearform sugar to fat ratio of up to and above 2.33 can yield a firm, temperature resistant yet chewable matrix.

A particularly preferred application of this invention is the formation of improved chocolate comestibles which remain hard at elevated temperatures at which cocoa butter or other substitute fats usually flow. An improved chocolate comestible has been made by forming an admixture of cocoa butter, 6X granular sucrose, chocolate liquor and an amorphous shearform sugar. All ingredients were admixed under constant stirring at 115° F. After mixing all ingredients for only one hour at 115° F., a fine matrix was formed which had high temperature resistance, good oleaginous retention properties and yet remain very chewable. It has been found that while small amounts of amorphous shearform sugar improve oil retention properties and high amounts of amorphous shearformed sugar produce very quickly a firm solid matrix, ratios of amorphous shearform sugar floss to cocoa butter of about 0.33 to 0.75 provide a range in which conching and tempering can be achieved before coating or casting the chocolate.

In a preferred embodiment, the amorphous sugar has been spun with cocoa butter and/or an emulsifier in order to provide a sugar floss more resistant to humidity.

In yet another aspect of this invention, an improved chocolate coating has been produced by admixing an amorphous shearform sugar produced as a shearform matrix with chocolate liquor, milk fat or cocoa butter prior to passing the chocolate liquor mixture through refining roles.

Another application of this invention is the formation of an improved peanut butter comestible containing a controlled melting point matrix formed by admixing an amorphous sugar floss produced in a shearform matrix with ground peanuts and subjecting the admixture to temperatures above 100° F. It has been found that when the ratio of amorphous sugar floss to peanut oil is above 0.4 a hard matrix is formed which has high oil retention properties. When the ratio of amorphous shearform sugar to peanut oil is above 0.7 a rigid crumbly texture is obtained which is highly desirable for use in peanut butter candy bars and confections.

In another preferred embodiment of the improved peanut butter comestible, the amorphous shearform sugar was formed from a feedstock containing peanut oil as a crystallization-control agent. An amorphous peanut oil containing shearform sugar is especially useful in preventing premature crystallization of the amorphous sugar.

Details of the invention have been set forth herein in the form of examples which are described below. The full scope of the invention will be pointed out in the claims which follow the specification.

EXAMPLES

Example 1

Compositions containing oils having a shearform matrix sugar/fat ratio of about 1 were prepared by mechanically mixing the oils with an almost equal percentage of amorphous shearform matrix sugar. A control sample (Sample 7) containing no floss but, in its place, an equal amount of 6X granular sugar was also included. The amorphous shearform sugar (floss) used was prepared by melt spinning 6X granular sucrose in an Econo-Floss spinning machine operated at 200° C. at 3600 r.p.m. using a 5½ inch diameter head.

Table I lists samples of compositions containing oils where the floss/fat ratio is 1 or almost 1. The flow point of the final matrix obtained by the method of the invention is also listed.

In the control Sample 7 the oil was heated to 115° F. and mixed with an equal percentage of 6X granular sugar. After stirring and holding the mixture at 115° F. for seven days, the control sample remained liquid and could be readily stirred. No solidification occurred.

In Samples 1–4 and 6, low melting point oils were heated to 115° F. and intimately admixed with an equal or almost equal amounts of amorphous sugar floss, and then held at 115° F. for 12 hours. At the end of the 12 hour period the resulting samples were hard solids at 115° F.

In Sample 5, a high melting point oil was heated to 150° F. and then admixed with an equal percentage of amorphous sugar floss. The sample was then held at the 150° F. for one day. At the end of this period the sample was a uniformly hard solid.

The sugar floss used in Samples 1 to 6 was microscopically analyzed and was substantially amorphous. The samples of hardened product obtained after admixing and holding at elevated temperatures in Samples 1 to 6 were also microscopically examined and were found to have been converted in part to a fine crystalline structure.

The Samples listed in Table I illustrate a unique feature of this invention, namely that by mixing low-melting point oils with an amorphous sugar floss in a ratio of floss to fat of about 1.0, high-melting point solids are formed where the final composition has a fine crystalline structure. Moreover, the flow point of the final compositions obtained in Samples 1–6 are appreciably higher than the flow point temperatures of a mixture of 6X granular sucrose and the oils listed in Table I. This demonstrates the unique feature of the present invention.

TABLE I

LOW MELTING POINT COMPOSITIONS

| Sample | Fat Sample | Melting Point °C. | % Oil | % Floss | Floss/ Fat Ratio | Crystalline % Sugar | Slip Point | Flow Point |
|---|---|---|---|---|---|---|---|---|
| 1 | Canola Oil | −17 | 50 | 50 | 1 | — | | 180° C. |
| 2 | Corn Oil | | 50 | 50 | 1 | — | | 175° C. |
| 3 | Peanut Oil | | 50 | 50 | 1 | — | | |
| 4 | Soybean Oil | | 50 | 50 | 1 | — | | 185° C. |
| 5 | Hydrogenated Veg. Oil | | 50 | 50 | 1 | — | | 110° C. |
| 6 | Soybean Oil | | 60 | 40 | 0.67 | — | | |
| 7 Control | Soybean Oil | | 50 | — | — | 50 | | * |

*The mixture flowed readily at room temperature.

Example 2

Peanut Butter Compositions

High-melting point peanut butter compositions as set forth in Table II were prepared by mechanically mixing amorphous shearform sugar with peanut butter in different shearform sugar to fat ratios at 120 ° F. The shearform sugar used in each example was prepared by melt spinning 6X granular sucrose by itself in an Econo-Floss spinning machine operated at 200° C. at 3600 r.p.m. using a 5½ inch diameter head (herein floss). Table II illustrates improved peanut butter compositions obtained by the method of this invention. All samples were mixed in a Hobart mixer for twenty minutes and held at 120° F. for six hours. The control sample 1 retained the viscous liquid consistency of a commercial peanut butter spread. In contrast, Sample 2 formed a stiff solid composition. Sample 3 had a dry, crumbly texture. Significantly, Sample 3 had improved resistance to peanut oil migration. As a result, the stiff crumbly texture obtained when the ratio of sugar floss to peanut butter is above 0.7 is highly desirable in the preparation of improved peanut butter candies. When the improved peanut butter composition obtained in accordance with this invention is covered with chocolate, no noticeable peanut oil migration is noticed from the peanut butter matrix into the outside chocolate layer in samples held at room temperature.

Moreover, when a peanut butter candy bar was made by enrobing the improved peanut butter layer with a chocolate layer no migration of peanut oil out of the candy bar was noticed. Another preferred application of this invention is the formation of an improved peanut butter candy bar which contains a layer of peanut butter enrobed with a layer of a chocolate comestible, each made in accordance with the method of this invention.

TABLE II

IMPROVED PEANUT BUTTER COMPOSITIONS

| Sample | Floss Weight % | Crystalline Sucrose Weight % | Peanut Butter Weight % | Floss/ Fat Ratio |
|---|---|---|---|---|
| 1 Control | 0 | 25 | 75 (½ oil) | — |
| 2 | 25 | 0 | 75 (½ oil) | 0.67 |
| 3 | 40 | 0 | 60 (½ oil) | 1.33 |

Example 3

Solid Cocoa Butter Compositions

Solid Cocoa butter compositions with floss/fat ratios varying from 0.33 to 2.33 were prepared by mechanically mixing an amorphous shearform sugar, a cocoa butter component and 6X granular crystalline sucrose in different proportions. A control sample (Sample 7) was also included.

The amorphous shearform sugar (floss) floss used in each example was prepared by melt spinning 6X granular sucrose in an Econo-Floss spinning machine operated at 200° C. at 3600 r.p.m. using a 5½ diameter head. Table III illustrates concentrations of cocoa butter, floss, sucrose in weight per cent, the ratio by weight of floss to fat, the slip and flow points for the controlled melting point matrix obtained in each example.

Each cocoa butter composition was formed by heating cocoa butter and lecithin to 130° F., mechanically mixing a portion of the cocoa butter with the amorphous floss and 6X granular sucrose until an intimately mixed composition is obtained with enough cocoa butter to provide a mix for refining. The mixture was then refined in a three roll refining machine at 350/450 psi and returned to a clean bowl where the remainder of the cocoa butter/lecithin was slowly added to form a smooth mix. The mixture was then maintained at 110° F. to 120° F. and mixed for thirty minutes. The finished product was stored at 125°-130° F. During the holding period of five days at 130° F., the control sample remained liquid. In contrast, the mixtures obtained in Samples 3, 5, 6, 8 and 10 became uniform hard solids after a holding period of 1-2 hours. Similarly, Samples 9, 11 and 12 became uniform hard solids after a holding period of hours- The flow points of the samples formed by mixing amorphous sugar with cocoa butter are considerably higher than those of a mixture of cocoa butter with nonprocessed sugar. For example, the sample of Example 2 has a slip point of above 175° F. and the control sample had a slip point of 83 ° F.

Thus, the melting point of cocoa butter compositions can be significantly/increased and controllably by adjusting the floss to fat ratio of the composition. The artisan will appreciate that the applications of the present invention are vast.

TABLE III

COCOA BUTTER COMPOSITIONS

| Sample* | Cocoa Butter Weight % | Floss Weight % | Crystalline Sucrose Weight % | Floss/Fat Ratio |
|---|---|---|---|---|
| 1 | 30 | 70 | 0 | 2.33 |
| 2 | 30 | 40 | 30 | 1.33 |
| 3 | 30 | 10 | 60 | 0.33 |
| 4 | 40 | 60 | 0 | 1.50 |
| 5 | 40 | 40 | 20 | 1.00 |
| 6 | 40 | 20 | 40 | 0.50 |
| 7 Control | 40 | 0 | 60 | 0.00 |
| 8 | 50 | 50 | 0 | 1.00 |
| 9 | 50 | 25 | 25 | 0.50 |
| 10 | 60 | 40 | 0 | 0.67 |
| 11 | 60 | 30 | 10 | 0.50 |
| 12 | 70 | 30 | 0 | 0.42 |

*Lecithin is present in each sample at 2 gr for each 500 grams of the other three ingredients.

Example 4

High Melting Point Chocolate Compositions

High-melting point chocolate compositions as listed in Table IV were prepared by mechanically mixing 6X granular sugar, chocolate liquor, cocoa butter and amorphous shearform sugar. The amorphous shearform sugar (floss) used in each example was prepared by melt spinning 6X granular sucrose by itself or, as in Samples 1 and 2 together with cocoa butter and lecithin in an Econo-Floss spinning machine operated at 200° C. at 3600 r.p.m. using a 5½ inch diameter head.

The ingredients of each sample were mechanically mixed and then milled in a three roll refining machine and then held at 115° F. under constant stirring until they became stiff. After stirring for one hour at 115° F., the samples 1 and 2 hardened into a uniform solid. Sample 3 hardened into a solid only after several hours of stirring at 115° F. In contrast, after several hours of continuous stirring at 115° F., control Sample 4 remained liquid.

The slip point of each sample was measured and is listed in Table IV. The control chocolate sample which has no amorphous sugar has a low slip point. Remarkably, the chocolate obtained by using the method of the invention is a hard uniform solid having a fine crystalline structure. The resulting chocolate compositions have significantly higher slip and flow points than the control sample. The hardened chocolate is a superior product, showing improved resistance to blooming and exhibiting great resistance to collapse of the mass at room temperature or at temperatures above the melting point of cocoa butter.

TABLE IV

CHOCOLATE COMPOSITIONS

| Sample | Sample Composition | Weight (Grams) | Floss/Fat Ratio | Slip Point °F. | F-Floss Mixture % |
|---|---|---|---|---|---|
| 1 | Sucrose | 740 | 1.4 | Above 175° F. | Sucrose 89 |
|   | Chocolate Liquor | 1540 (847 gr. cocoa butter) | | | Cocoa Butter 10 |
|   | Cocoa Butter | 410 | | | Lecithin 1 |
|   | F-7 Floss | 1800 | | | |
| 2 | Sucrose | 722 | 1.4 | Above 175° F. | Sucrose 30 |
|   | Chocolate Liquor | 1590 (874 gr. cocoa butter) | | | Cocoa Butter 10 |
|   | Lecithin | 18 | | | |
|   | Cocoa Butter | 410 | | | |
|   | F-8 Floss | 1800 | | | |
| 3 | Sucrose | 722 | 1.1 | Above 175° F. | Sucrose 100 |
|   | Chocolate Liquor Discs | 1590 (874 gr. cocoa butter) | | | |
|   | Lecithin | 18 | | | |
|   | Cocoa Butter | 590 | | | |
|   | F-5 Floss | 1620 | | | |
| 4 Control | Sucrose | 2342 | — | 92-96° F. | — |
|   | Chocolate Liquor | 1590 | | | |
|   | Lecithin | 18 | | | |
|   | Cocoa Butter | 590 | | | |

Example 5

High melting Point Chocolate Compositions

High-melting point chocolate compositions as listed in Table V were prepared by mechanically mixing 6X granular sugar, chocolate liquor, cocoa butter and amorphous shearform sugar. The amorphous shearform sugar (floss) used in each example was prepared by melt spinning 6X granular sucrose by itself or, as in Sample 1, together with cocoa butter in an Econo-Floss spinning machine operated at 200° C. at 3600 r.p.m. using a 5½ inch diameter head.

The ingredients of each sample were mechanically mixed and then milled in a three roll refining machine.

The samples were cast into bars after one hour of tempering at 115° F. Sample 1 had a slightly higher viscosity than the control but both the control and Sample 1 could be used with conventional techniques to form tempered cast bars. Sample 2 had a higher viscosity but could be used to form cast bars. The crystallization control agent incorporated in the floss of Sample 1 provides better process latitude for tempering, coating and casting procedures than the floss without the crystallization control agent.

TABLE V

| SAMPLE | WEIGHT (GRAMS) | FLOSS/FAT RATIO | SLIP POINT | FLOSS MIXTURE |
|---|---|---|---|---|
| Control | | | | |
| Sucrose - 6X | 2350 | — | 98° F. | — |

TABLE V-continued

| SAMPLE | WEIGHT (GRAMS) | FLOSS/FAT RATIO | SLIP POINT | FLOSS MIXTURE |
|---|---|---|---|---|
| Floss | — | | | |
| Cocoa Butter | 590 | | | |
| Chocolate Liquor | 1590 (874 gr. Cocoa Butter) | | | |
| Lecithin | 18 | | | |
| Sample 1 | | | | |
| Sucrose - 6X | 1755 | .41 | Above 210° F. | 90% Sucrose 10% Cocoa B. |
| Floss | 650 | | | |
| Cocoa Butter | 590 | | | |
| Chocolate Liquor | 1590 (874 gr. Cocoa Butter) | | | |
| Lecithin | 18 | | | |
| Sample 2 | | | | |
| Sucrose - 6X | 1755 | .41 | Above 210° F. | 100% Sucrose |
| Floss | 585 | | | |
| Chocolate Liquor | 1590 (874 gr. Cocoa Butter) | | | |
| Lechithin | 18 | | | |

Example 6

300 gm of Planters Fresh Roasted Peanuts (Vacuum Packed) were placed in a mortar and pestle and ground until they became a creamy type substance. Two samples of these crushed peanuts were used to make controlled melting point peanut butter compositions. Two portions of the crushed peanuts were placed in separate glass jars and mixed with floss prepared from 100% granular sucrose. The floss (1031-48) had been prepared in a food grade tornado (3600 rpm) set on high temperature (200° C.).

The jars containing each of the mixtures were placed in an H₂O bath at 115° F. A Sample A was prepared from 25% floss and 75% peanut butter, and a Sample B was prepared from 40% floss and 60% peanut butter. The jars were closed and maintained in the bath at 115° F.

A) (25%) Gran. Suc. Floss+(75%) Peanut Butter at 115° F.

After three days in the bath Sample A set up. The viscosity of the matrix was similar to that of Sample B, although not quite as hard. There was no free oil on top of the material. The flow point test results showed the point to be above 185° C.

B) (40%) Gran. Suc. Floss+(60%) Peanut Butter at 115° F.

After 24 hours in the bath Sample B set up to a hard candy type consistency. There was no free oil on top of the matrix. The flow point test results showed the point to be above 185° C.

A comparison flow test was also conducted on JIF ® creamy peanut butter. The test showed the flow point of JIF ® peanut butter to be around 40° C., at least 145° C. lower than the controlled melting point peanut butter compositions. Thus the present invention resulted in an amazing increase of flow point of 145° C.

Thus, while there have been described what are presently believed to be the preferred embodiments of the present invention, the skilled artisan in the art will appreciate that other and further modifications may be made which come within the scope of the invention and it is intended to include all such modifications and changes which come within the true spirit of the invention.

What is claimed is:

1. A controlled melting point matrix which comprises an admixture of a substantially solid amorphous material processed by subjecting a feedstock to conditions of temperature and pressure which induce flash flow of said feedstock, and a hydrophobic material, said admixture subjected to conditions of temperature, pressure, and humidity which induce at least partial crystallization of said substantially amorphous material, whereby said hydrophobic material is captured during said partial crystallization to provide said matrix, said matrix having a slip point or flow point temperature higher than the respective slip point or flow point temperature of a mixture of said feedstock in a non-processed condition and said hydrophobic material.

2. The controlled melting point matrix of claim 1, wherein said feedstock comprises a saccharide-based product selected from the group consisting of sucrose, lactose, fructose, sorbitol, mannitol, maltose, polydextrose, maltodextrin and mixtures thereof.

3. The controlled melting point matrix of claim 2, wherein said saccharide-based product is sucrose.

4. The controlled melting point matrix of claim 2, wherein said saccharide-based product is polydextrose.

5. The controlled melting point matrix of claim 1, wherein said hydrophobic material is an oleaginous material selected from the group consisting of cocoa butter, peanut butter, milk fat, canola oil, corn oil, peanut oil, soybean oil, hydrogenated vegetable oil and mixtures thereof.

6. The controlled melting point matrix of claim 1, wherein the weight ratio of said substantially amorphous material to said hydrophobic material is from at least 0.33 to at least about 2.33.

7. The controlled melting point matrix of claim 6, wherein said ratio is about 1.0.

8. The controlled melting point matrix of claim 1, wherein said substantially amorphous material further comprises a crystallization control agent.

9. The controlled melting point matrix of claim 8, wherein said crystallization-control agent is an antihumectant.

10. The controlled melting point matrix of claim 9, wherein said crystallization control agent is an oleaginous material selected from the group consisting of cocoa butter, peanut butter, milk fat, canola oil, corn oil, peanut oil, soybean oil, hydrogenated vegetable oil and mixtures thereof.

11. The controlled melting point matrix of claim 10, wherein said oleaginous material does not exceed 10% by weight of said substantially amorphous material.

12. The controlled melting point matrix of claim 1, which further comprises a second saccharide-based product selected from the group consisting of sucrose, lactose, fructose, sorbitol, mannitol, maltose, polydextrose, maltodextrin and mixtures thereof.

13. The controlled melting point matrix of claim 12, wherein the weight ratio of said substantially amorphous material to said hydrophobic material is from at least about 0.4 to about 2.33.

14. The controlled melting point matrix of claim 12, further comprising an emulsifier.

15. The controlled melting point matrix of claim 12, wherein said substantially amorphous material is present in an amount sufficient to increase the melting point of said matrix to at least 115° F.

16. The controlled melting point matrix of claim 12, wherein the weight ratio of said substantially amorphous material to said hydrophobic material is from at least about 1.1 to about 1.4.

17. The controlled melting point matrix of claim 1, wherein said hydrophobic material is selected from a group consisting of peanut oil, peanut butter and mixtures thereof mixed with said substantially amorphous material in a weight ratio of said substantially amorphous material to said hydrophobic material of at least about 0.5 at a temperature of at least about 100° F.

18. The controlled melting point matrix of claim 17, wherein said ratio is at least about 0.33 to at least about 1.00.

19. The controlled melting point matrix of claim 1, wherein said feedstock is subjected to melt spinning conditions to form a substantially amorphous material.

20. The controlled melting point matrix of claim 1, wherein said feedstock is subject to shearing conditions sufficient to form a shearform matrix.

21. An improved comestible comprising a controlled melting point matrix formed by admixing a substantially amorphous material processed by subjecting a feedstock to conditions of temperature and pressure which induce flash flow of said feedstock, with a hydrophobic material to form an admixture and subjecting said admixture to conditions which induce at least partial crystallization of said substantially amorphous material, whereby said hydrophobic material is captured during said partial crystallization to provide said matrix, said matrix having a flow point temperature higher than a flow point temperature of a mixture of said feedstock in a nonprocessed condition and said hydrophobic material.

22. An improved candy bar comprising a layer of improved peanut butter comestible formed in accordance with claim 21, wherein said hydrophobic material is peanut butter and said substantially amorphous material is sugar mixed in a weight ratio of said substantially amorphous material to said hydrophobic material of about 0.7 at a temperature of at least about 100° F.

23. The improved candy bar of claim 22, wherein said chocolate layer is an improved chocolate comestible formed by admixing substantially amorphous sugar processed by subjecting a feedstock including sugar to conditions of temperature and pressure which induce flash flow of said feedstock, with cocoa butter, a chocolate bearing component and 6X granular sugar; and subjecting said admixture to conditions which induce at least partial crystallization of said amorphous sugar, wherein the weight ratio of said substantially amorphous sugar to said cocoa butter is from at least about 1.1 to about 1.4.

24. A method of preparing a controlled melting point matrix comprising:

a) admixing a substantially amorphous material processed by subjecting a feedstock to conditions of temperature and pressure which induce flash flow of said feedstock, with a hydrophobic material; and b) subjecting said admixture resulting from step a to conditions which induce at least partial crystallization of said substantially amorphous material, whereby said hydrophobic material is captured during said partial crystallization to provide said matrix, said matrix having a flow point temperature higher than a flow point temperature of a mixture of said feedstock in a nonprocessed condition and said hydrophobic material.

25. The method of claim 24, wherein said feedstock comprises saccharide-based products selected from the group consisting of sucrose, lactose, fructose, sorbitol, mannitol, maltose, polydextrose, maltodextrin and mixtures thereof.

26. The method of claim 24, wherein said hydrophobic material is an oleaginous material selected from the group consisting of cocoa butter, peanut butter, milk fat, canola oil, corn oil, peanut oil, soybean oil, hydrogenated vegetable oil and mixtures thereof.

27. The method of preparing a controlled melting point matrix of claim 24, wherein the weight ratio of said substantially amorphous material to said hydrophobic material is from at least 0.33 to at least about 2.33.

28. The method of claim 24, wherein said ratio is about 1.0.

29. The method of claim 24, wherein said substantially amorphous material further comprises a crystallization control agent.

30. The method of claim 29, wherein said crystallization agent is an antihumectant.

31. The method of claim 30, wherein said crystallization control agent is an oleaginous material selected from the group consisting of cocoa butter, peanut butter, canola oil, corn oil, peanut oil, soybean oil, hydrogenated vegetable oil and mixtures thereof.

32. The method of claim 31, wherein said oleaginous material does not exceed 10% by weight of said substantially amorphous material.

33. The method of claim 24, which further comprises a second saccharide-based product selected from the group consisting of sucrose, lactose, fructose, sorbitol, mannitol, maltose, polydextrose, maltodextrin and mixtures thereof.

34. The method of claim 33, wherein the weight ratio of said substantially amorphous material to said hydrophobic material is from at least about 0.5 to about 2.33.

35. The method of claim 33, further comprising emulsifier.

36. The method of claim 33, wherein said substantially amorphous material is present in an amount sufficient to increase the melting point of said matrix to at least 115° F.

37. The method of claim 34, wherein the weight ratio of said substantially amorphous material to said hydrophobic material is from at least about 1.1 to about 1.4.

38. The method of claim 24, wherein said hydrophobic material is selected from a group consisting of peanut butter, peanut oil and mixtures thereof mixed with said substantially amorphous material in a weight ratio of said substantially amorphous material to said hydrophobic material of at least about 0.5 at the temperature of at least about 100° F.

39. The method of claim 38, wherein said ratio is at least about 0.33 to at least about 1.00.

40. The method of claim 24, wherein said feedstock is subjected to melt spinning conditions to form a substantially amorphous material.

41. The method of claim 24, wherein said feedstock is subject to shearing conditions to form a shearform matrix.

* * * * *